United States Patent [19]

Guitteny et al.

[11] Patent Number: 4,572,839
[45] Date of Patent: Feb. 25, 1986

[54] PROCESS FOR THE RAPID STERILIZATION OF PARTIALLY HYDROLYZED ANIMAL OFFAL

[75] Inventors: Jean-Louis Guitteny, Jargeau; Roger Pernod, Bouzy la Forêt; Christian Roques, St. Jean de Braye; Guy Tran Van, Clery Saint André, all of France

[73] Assignee: Unisabi, S.A., Paris, France

[21] Appl. No.: 726,941

[22] Filed: Apr. 25, 1985

Related U.S. Application Data

[63] Continuation of Ser. No. 403,933, Aug. 2, 1982, abandoned.

[30] Foreign Application Priority Data

Aug. 7, 1981 [FR] France ............................. 81 15392

[51] Int. Cl.$^4$ ............................................. A23L 1/312
[52] U.S. Cl. ...................................... 426/646; 426/59; 426/647; 426/521; 426/644
[58] Field of Search ...................... 426/7, 55, 520, 521, 426/657, 656, 32, 56, 59, 641, 644, 646, 647; 435/68, 69, 804

[56] References Cited

U.S. PATENT DOCUMENTS 4,233,320 11/1980 Monaco et al. ......................... 426/7
4,293,571 10/1981 Olofsson et al. ....................... 426/7

FOREIGN PATENT DOCUMENTS 993706 6/1965 United Kingdom .

Primary Examiner—Raymond Jones
Assistant Examiner—Marianne M. Cintins
Attorney, Agent, or Firm—Curtis, Morris & Safford

[57] ABSTRACT

A method for rapidly sterilizing animal protein to give a product for use as a foodstuff is disclosed wherein animal protein is ground to bring it into a state of a viscous slurry of particles of animal protein having a mean particle size from about 0.1 millimeter to 20 millimeters, the slurry is hydrolyzed, and the hydrolyzed slurry is sterilized by heating in a thin layer at a temperature from about 120° C. to about 150° C. for a time between about 3 seconds and about 15 minutes.

8 Claims, No Drawings

PROCESS FOR THE RAPID STERILIZATION OF PARTIALLY HYDROLYZED ANIMAL OFFAL

This application is a continuation of application Ser. No. 403,933, filed Aug. 2, 1982 now abandoned.

The present invention relates to a process for the rapid sterilisation of protein materials which are intended for the foodstuff industry, and especially protein materials of animal origin, in particular meat and offal.

The previous technique, currently used by the foodstuff industry to ensure sterilisation of protein materials, and in particular protein materials of animal origin, consists of subjecting the said materials to a heat treatment at a temperature of the order of 120° C. for about 2 hours, for example in a cooker.

The principal disadvantage of this conventional sterilisation technique of course resides in excessive energy consumption and also in a major waste of time in industries where an essential requirement is to be able to operate processes continuously.

In addition to the major waste of time and energy which the conventional type of sterilisation by high temperature heating for a long period entails, such an operation very frequently has an adverse influence on the taste and organoleptic properties of the meat or offal thus treated, because of the coagulation phenomena due to overheating or overcooking. It should also be noted that these coagulation phenomena, which are principally observed in the case of certain offal such as liver and also in the case of blood, can cause encrusting or even complete blockages of certain apparatus of the production units. to eliminate all the disadvantages inherent in the above-mentioned prior art.

The sterilisation process according to the present invention consists of carrying out the following successive operations:

(a) fluidisation of the said protein material to bring it to the state of a viscous slurry in which the solid particles have a mean size of the order of 0.1 to 20 mm and preferably of the order of 0.5 to 10 mm, (b) hydrolysis of the said slurry, and (c) sterilisation of the hydrolysate by high temperature heat treatment in a thin layer for a brief period, of the order of 3 seconds to 15 minutes.

Such a process has made it possible to achieve perfect sterilisation of the treated protein materials, as evidenced by the excellent results of bacteriological analysis carried out on the products treated according to the invention.

Various other characteristics and advantages of the process forming the subject of the present invention will emerge on reading the detailed description given below, especially with reference to a few examples given purely by way of illustration.

The present invention relates to a sterilisation process which is intended to be applied to protein materials of very diverse types, but principally to protein materials of animal origin, such as, for example, meat, offal, viscera and other abattoir waste, such as the skin and carcasses of poultry, fatty by-products, gristle, blood and bones. The sterilisation process according to the invention is thus applicable to these protein materials considered as starting materials, but it is also applicable to finished foodstuffs such as dogfood and catfood, for example the so-called intermediate-moisture products, that is to say products containing 15 to 60% by weight of moisture.

According to the present invention, these protein materials are initially subjected to a preparation operation which is in fact intended to fluidise the said protein materials and to make them suitable for undergoing, under satisfactory conditions, the high temperature heat treatment in a thin layer intended to effect their sterilisation.

This first preparation stage can vary somewhat from one protein material to another. In general, to ensure fluidisation of the protein materials, these materials are ground to give a viscous slurry in which the solid particles have a mean size of the order of 0.1 to 20 mm and preferably of the order of 0.1 to 10 mm. This grinding operation, which may be, of course, omitted in the particular case where materials which are to start with in the liquid state, such as blood, are treated, is conventionally carried out in grinding devices usually employed in, for example, the animal food industry.

Depending on the exact nature of the protein materials, it may be desirable to subject the ground material to an additional agitation operation in order to ensure better homogenisation of the said slurry. Where necessary, water, or a material very rich in water, is also added during this agitation operation.

During the treatment of meat, offal, abattoir waste and mixtures of this type usually employed in the animal food industry, there is obtained, after this first fluidisation stage, a viscous slurry having a viscosity of about 100,000 to 200,000 centipoises.

It should be noted that this mechanical operation of fluidisation by grinding is by itself insufficient to permit the subsequent sterilisation in a thin layer which, according to the present invention, can only be achieved by carrying out a hydrolysis operation of the said slurry of protein materials. In fact, this hydrolysis completes the fluidisation operation because it causes partial breakdown of the protein materials into their constituents of lower molecular weight, for example albumoses, peptones, polypeptides, dipeptides and aminoacids. However, this hydrolysis also fulfils another essential function because, by virtue of the protein conversion which it causes, it makes it possible to avoid coagulation phenomena or unpleasant changes in the taste of the said materials.

According to the present invention, the hydrolysis operation can be carried out in various ways, for example enzymatically. For this latter purpose, a proteolytic enzyme is employed, for example chosen from amongst pepsin, trypsin, chymotrypsin, papain, chymopapain, cathepsin and their mixtures. Such an enzyme must be added directly to the ground protein materials or be formed in situ by adding a micro-organism which secretes the said enzyme or be introduced by means of a carrier which is naturally rich in enzymes, such as, for example, bovine stomach.

As a variant, the hydrolysis operation can also be carried out by addition of acids to the said viscous slurry. By way of examples of acids capable of being used to bring about this hydrolysis operation, there may be mentioned phosphoric acid, formic acid, acetic acid, stearic acid, oxalic acid, malonic acid, oleic acid, maleic acid, fumaric acid, phthalic acid, glycolic acid, lactic acid, glyceric acid, malic acid, tartaric acid and citric acid as well as their mixtures, as well as all organic or inorganic acids generally capable of being used in edible products, especially for animals, including strong acids such as HCl or $H_2SO_4$.

It should finally be noted that this hydrolysis operation can also be carried out by addition of a base to the said viscous slurry, for example by addition of a strong base chosen from amongst sodium hydroxide, potassium hydroxide and lime.

At the end of this hydrolysis operation, the protein material is converted to a viscous slurry having a viscosity between about 100 and about 100,000, preferably between about 1,000 and about 50,000 centipoises.

Such a hydrolysis operation, constituting one of the essential stages of the sterilisation process according to the invention, is carried out at a temperature of the order of 10° C. to 95° C., and preferably of the order of 20° to 65° C., for a period which is essentially between 3 minutes and 1 hour 30 minutes. In practice, the hydrolysis operation has been carried out satisfactorily by an enzymatic method, by addition of acids or by addition of a base, whilst keeping the temperature of the ground protein materials at about 50° C. for a period of the order of 5 minutes. It should be noted in this context that the duration of this operation can be changed quite significantly by varying the hydrolysis temperature. Thus it is possible, in practice, to utilise intermediate storage times or transport times between the abattoir and the site of the sterilisation installation in order to carry out this hydrolysis operation.

According to the present invention, the actual heat treatment can, for exmple, consist of:

rapidly raising the temperature of the hydrolysate, within a short period of the order of 1 to 5 minutes to a temperature between about 120° C. and about 150° C., keeping the temperature of the hydrolysate between about 120° C. and about 150° C. for a short period of the order of 3 seconds to 15 minutes, and then rapidly cooling the hydrolysate, within a short period of about 1 to 5 minutes, so as to give a temperature close to the use temperature, for example close to ambient temperature.

Such a high temperature heat treatment of the hydrolysate in a thin layer is advantageously carried out in a plate-type heat exchanger, a scraped-surface heat exchanger or a coil heat exchanger. The heat exchange is thus always effected in a thin layer of materials, of the order of a few millimeters to a few centimeters, in direct contact with the wall of the exchanger.

By way of examples there may be mentioned that when using a scraped-surface heat exchanger perfect sterilisation is achieved by raising the temperature of the hydrolysate from 20° C. to 130° C. within a period of 3 minutes, then maintaining the temperature at 130° C. for 3 minutes and thereafter cooling the material, for example from 130° C. to 30° C., for a period of 3 minutes. By employing a plate-type heat exchanger it is possible to shorten quite considerably the periods required for raising the temperature and for cooling, since such a plate-type heat exchanger can raise the temperature of the hydrolysate of protein materials from 20° C. to about 130° C. within a short period, of the order of one minute.

The operation of rapidly cooling the hydrolysate, which has undergone the high temperature heat treatment in a thin layer, can also be carried out a heat exchanger of the same type as that used for the actual sterilisation heat treatment, that is to say a plate-type heat exchanger or a scraped-surface heat exchanger. In practice, and in order further to improve the economics of the process according to the invention, it is of course advantageous to couple the cooling circuit of the heat exchanger, which cools the sterilised protein material, to the heating circuit of the heat exchanger used for the sterilisation heat treatment.

Some examples of the operation of the rapid sterilisation process according to the present invention are given below by way of simple illustration.

EXAMPLE 1

Ground pigs liver is hydrolysed by acidification to a pH of about 4, set up by addition of 2% by weight of phosphoric acid. The hydrolysis is carried out for a period of about 15 minutes at a temperature of the order of 50° C. to 60° C.

The hydrolysate thus obtained is heated from 60° C. to 134° C. over a period of 1 minutes 30 seconds and is then kept at a temperature of 134° C. for 4 minutes 30 seconds to ensure sterilisation. The temperature is then brought to near ambient temperature over a period of about 3 minutes.

The heat treatment of the hydrolysate is carried out in a first heat exchanger with a plate-type surface and the cooling operation is carried out in a second heat exchanger with a plate-type surface. The heating fluid circuit of the first heat exchanger was coupled to the cooling circuit of the second exchanger so as to avoid energy losses during the cooling stage.

The bacteriological analysis of the ground pigs liver before and after sterilisation according to the invention has given the following results:

| GERMS PER GRAM | BEFORE STERILISATION | AFTER STERILISATION |
| --- | --- | --- |
| MESOPHILIC germs | >10$^4$ | none in 0.1 g |
| THERMOPHILIC germs | | |
| aerobic conditions | 9.10$^4$ | none in 0.1 g |
| anaerobic conditions | >10$^5$ | none in 0.1 g |
| SPORES | | |
| aerobic conditons | 10$^2$ | none in 1 g |
| anaerobic conditions | 10$^3$ | none in 1 g |

The ground pigs liver thus sterilised is thereafter preserved in accordance with the conventional methods, such as cooling, aseptic packaging or physico-chemical stabilisation. In every case, no microbial growth whatsoever appeared after storage of the product for 5 weeks at ambient temperature.

EXAMPLE 2

A ground product based on protein materials and corresponding to the following composition is produced:

| | |
| --- | --- |
| Pigs offal | 48% by weight |
| Cattle offal | 40% by weight |
| Blood | 10% by weight |
| Sodium chloride | 2% by weight |

This ground material is subsequently hydrolysed by the addition of papain, the hydrolysis being carried out for about 15 minutes at a temperature of the order of 50° C. Thereafter, the high temperature heat treatment in a thin layer is carried out in a scraped-surface exchanger, the sterilisation stage being effected by keeping the temperature at 140° C. for 3 minutes 30 seconds.

The bacteriological analysis of the ground pigs liver before and after sterilisation according to the invention gave the following results:

| GERMS PER GRAM | BEFORE STERILISATION | AFTER STERILISATION |
| --- | --- | --- |
| MESOPHILIC germs | $5.10^5$ | none in 0.1 g |
| THERMOPHILIC germs anaerobic conditions | $>10^5$ | none in 0.1 g |

The ground pigs liver thus sterilised is subsequently preserved in accordance with the conventional methods such as cooling, aseptic packaging or physico-chemical stabilisation. In every case, no microbial growth whatsoever appeared after storage of the product for 5 weeks at ambient temperature.

EXAMPLE 3

A ground product based on protein materials and corresponding to the following composition is produced:

| Poultry waste | 70% by weight |
| --- | --- |
| Cattle offal | 15% by weight |
| Pigs offal | 10% by weight |
| Animal fats | 5% by weight |

This ground material is thereafter hydrolysed by addition of pepsin, the hydrolysis being carried out for about 15 minutes at a temperature of the order of 50° C. Thereafter, the high temperature heat treatment in a thin layer is carried out as in Example 1, the sterilisation stage being effected in three different ways, namely:

(a) at 120° C. for 1 minute
(b) at 120° C. for 12 minutes
(c) at 130° C. for 10 minutes The bacteriological analysis of the above ground material, before and after sterilisation according to the invention, gave the following results:

| GERMS/GRAM | BEFORE STERILISATION | AFTER STERILISATION |
| --- | --- | --- |
| MESOPHILIC germs | $10^6$ | (a) $10^2$ |
| | | (b) $10^2$ |
| | | (c) none in 0.1 g |
| THERMOPHILIC germs | $10^4$ | (a) $10^2$ |
| | | (b) none in 0.1 g |
| | | (c) none in 0.1 g |
| SPORES aerobic conditions | $10^3$ | (a) none in 0.1 g |
| | | (b) none in 0.1 g |
| | | (c) none in 0.1 g |
| THERMOPHILIC germs anaerobic conditions | $10^5$ | (a) none in 0.1 g |
| | | (b) none in 0.1 g |
| | | (c) none in 0.1 g |
| SPORES anaerobic conditions | $10^4$ | |

Of course, the present invention is not restricted to the particular embodiments described above, and instead it is perfectly possible, without thereby going outside the scope of the present invention, to conceive a certain number of variants, especially for greater suitability to one or other type of protein material.

We claim:

1. A method for rapidly sterilizing a protein hydrolysis product of animal offal to give a product for use as a foodstuff, which method comprises:
   (a) grinding animal offal to bring it into the state of a viscous slurry of particles of animal protein having a mean particle size from about 0.1 millimeter to 20 millimeters,
   (b) partially hydrolyzing said slurry by the addition of acid thereto to convert animal protein therein to lower molecular weight constituents, and
   (c) then heating a thin layer of said hydrolyzed slurry at a temperature from about 120° C. to about 150° C. for a time between about 3 seconds and about 15 minutes to sterilize said slurry without coagulation of residual protein therein.

2. A method as in claim 1 wherein said hydrolysis is carried out at a temperature of about 50°-60° C. for about 15 minutes.

3. A method as in claim 1 wherein the mean particle size of the particles in said slurry is from about 0.5 millimeter to 10 millimeters.

4. A method as in claim 1 wherein said hydrolyzed slurry has a viscosity, at ambient temperatures, between about 100 and about 100,000 centipoises.

5. A method as in claim 1 wherein said hydrolyzed slurry has a viscosity, at ambient temperature, between about 1,000 and about 50,000 centipoises.

6. A method as in claim 1 wherein said acid is at least one member selected from the group consisting of phosphoric acid, formic acid, acetic acid, stearic acid, oxalic acid, malonic acid, oleic acid, maleic acid, fumaric acid, phthalic acid, glycolic acid, lactic acid, glyceric acid, malic acid, tartaric acid, and citric acid.

7. A method as in claim 1 wherein said sterilizing step (c) is performed by rapidly heating a thin layer of said hydrolyzed slurry to bring it to a temperature between about 120° C. and about 150° C. within a time between about 1 minute and about 5 minutes, maintaining the slurry at this temperature for a time between about 3 seconds and about 15 minutes, and then cooling the slurry to ambient temperature in about 1 minute to about 5 minutes.

8. A method as in claim 1 wherein said sterilizing step (c) is performed by rapidly heating a thin layer of said hydrolyzed slurry in a plate-type heat exchanger, a scraped-surface heat exchanger, or a coil heat exchanger.

* * * * *